J. H. REICHELT.
COMBINED CULTIVATOR AND TWIN SEED AND FERTILIZER SOWING IMPLEMENT.
APPLICATION FILED FEB. 9, 1920.
1,405,001.
Patented Jan. 31, 1922.
3 SHEETS—SHEET 1.
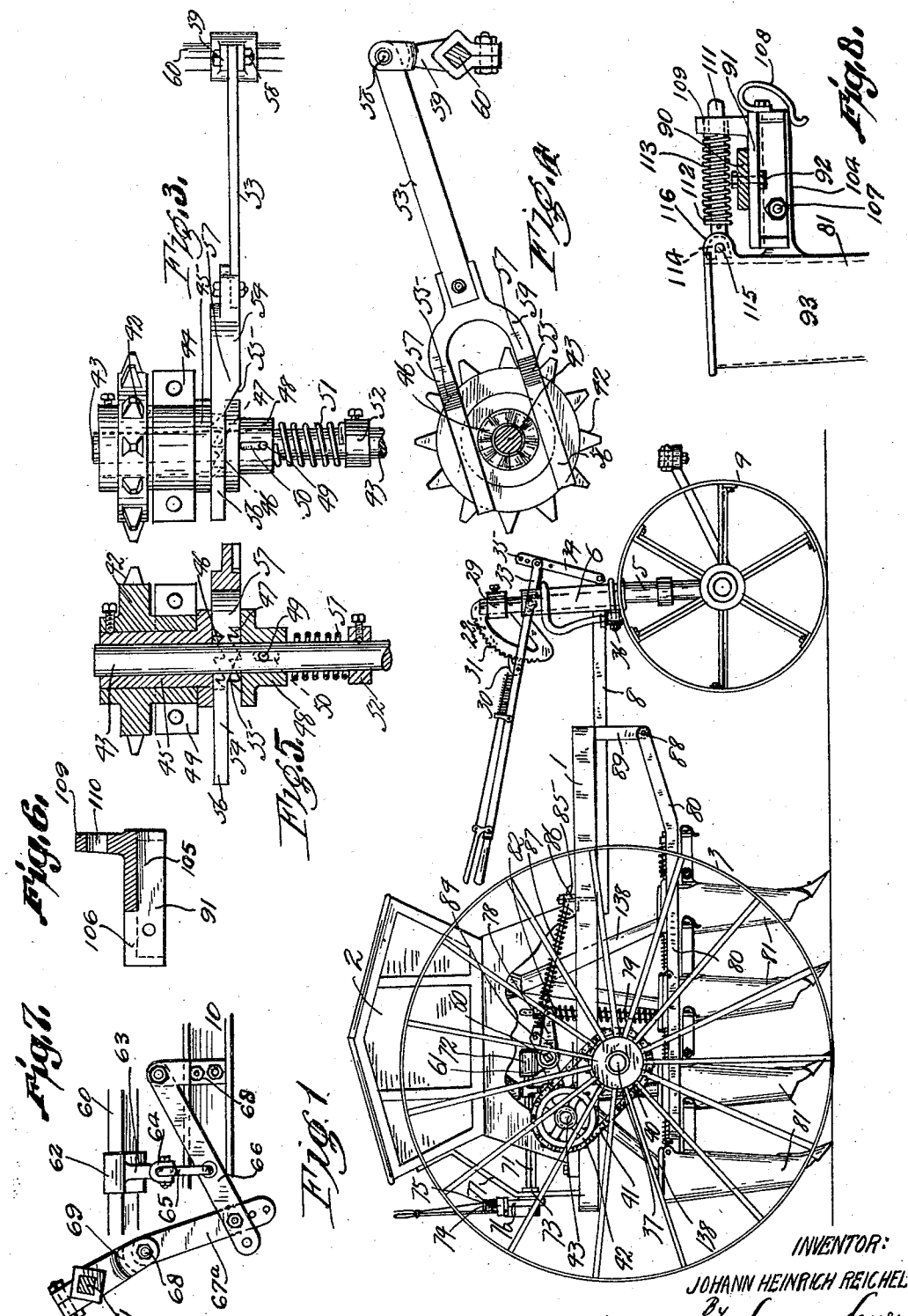
INVENTOR:
JOHANN HEINRICH REICHELT
By Lawrence Langner
ATTORNEY.

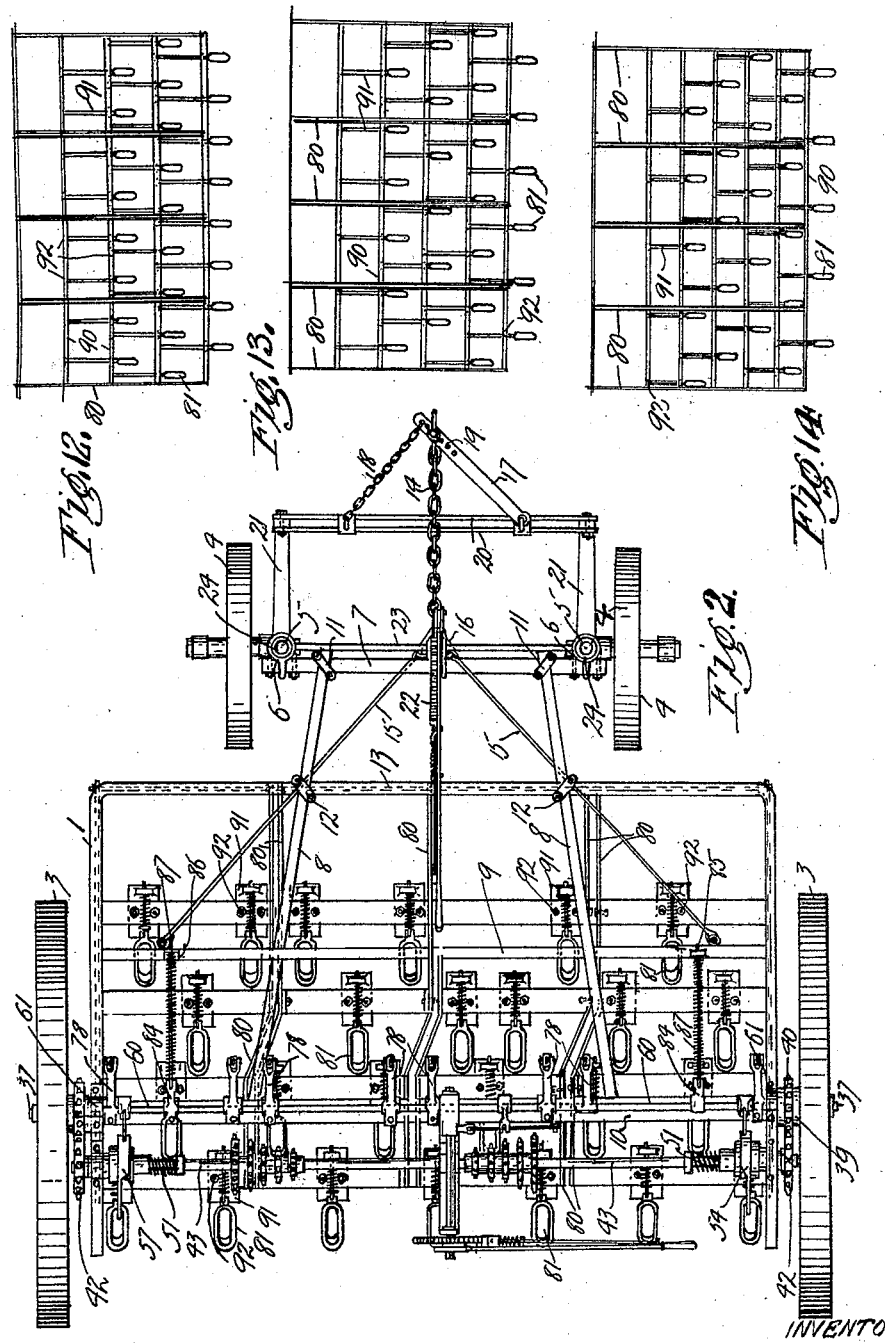

J. H. REICHELT.
COMBINED CULTIVATOR AND TWIN SEED AND FERTILIZER SOWING IMPLEMENT.
APPLICATION FILED FEB. 9, 1920.
1,405,001.
Patented Jan. 31, 1922.
3 SHEETS—SHEET 3.
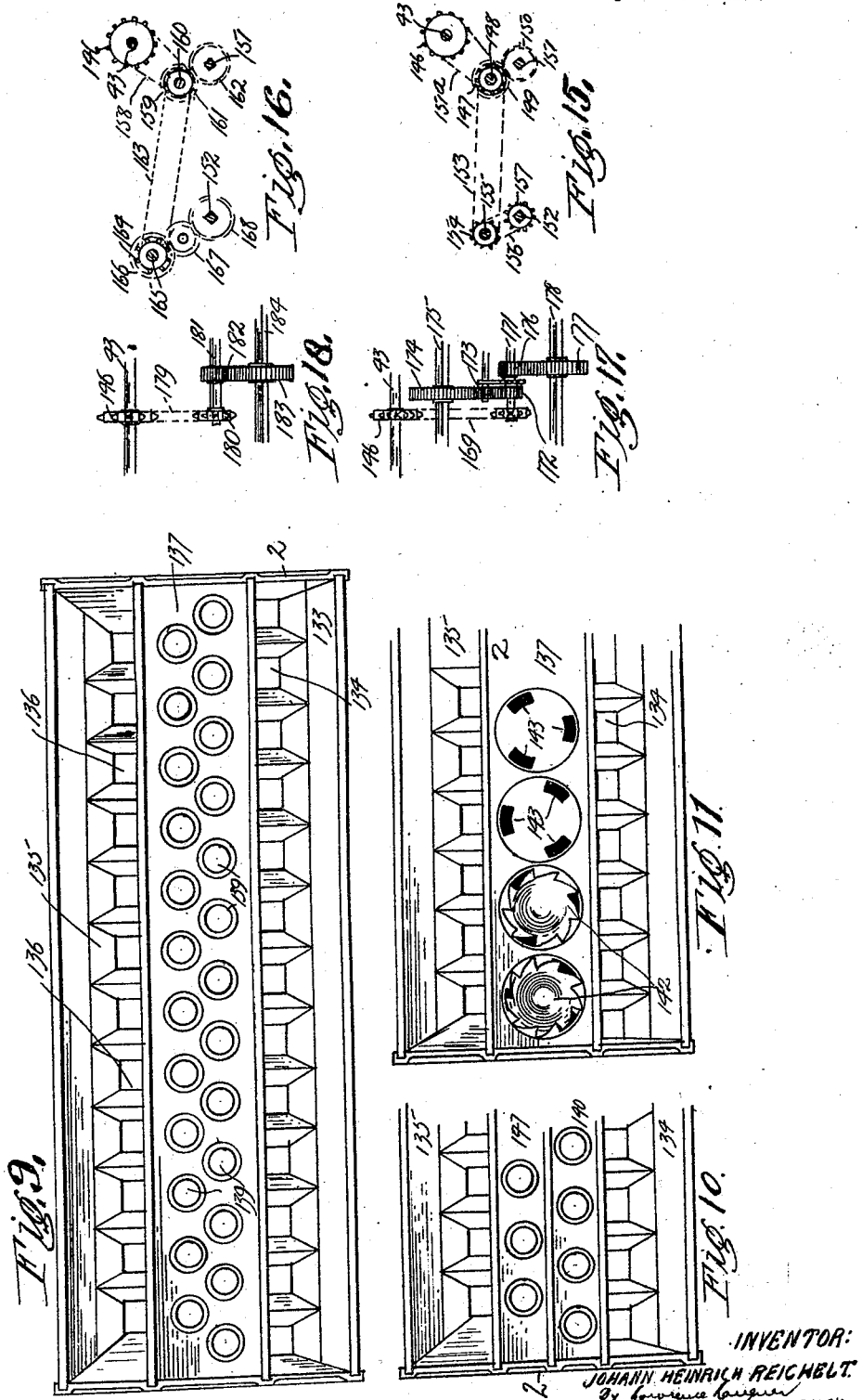
INVENTOR:
JOHANN HEINRICH REICHELT.
ATTORNEY.

UNITED STATES PATENT OFFICE.

JOHANN HEINRICH REICHELT, OF LORQUON, VICTORIA, AUSTRALIA.

COMBINED CULTIVATOR AND TWIN SEED AND FERTILIZER SOWING IMPLEMENT.

1,405,001.  Specification of Letters Patent.  Patented Jan. 31, 1922.

Application filed February 9, 1920. Serial No. 357,486.

*To all whom it may concern:*

Be it known that JOHANN HEINRICH REICHELT, a subject of the King of Great Britain, and resident of Lorquon, in the State of Victoria, Commonwealth of Australia, has invented a certain new and useful Improved Combined Cultivator and Twin Seed and Fertilizer Sowing Implement, of which the following is a specification.

This invention relates to a combined cultivator and twin seed and fertilizer sowing implement and has been specially devised in order to provide an implement of greater utility than those at present in use.

The art of seeding and fertilizing in cultivation as it at present exists is defective for the reason that the furrows are usually seven inches apart, and whereas a crop of greatly increased value would be obtained, using the same amount of seed and fertilizer if the furrows were approximately three and one half inches apart and a greater spread thus given to the seed and fertilizer, yet no machine has been evolved to accomplish this function in a single seeding and fertilizer operation.

This invention has, therefore, been devised in order to overcome existing defects and to provide an implement by the use of which the seed and fertilizer will be sown in furrows approximately three and one half inches apart in a simple and effective manner.

In order that the invention may be more readily understood it will now be described with reference to the accompanying drawings in which:—

Figure 1 is a view in side elevation of the improved implement, some of the parts being removed for the purposes of illustration.

Figure 2 is a view in plan of the implement with the seed and fertilizer distributing box removed.

Figure 3 is a view in plan of the clutch mechanism for controlling the drive of the moving parts of the implement.

Figure 4 is a view in side elevation partly in section, and

Figure 5 is a view in section of the said clutch mechanism.

Figure 6 is a view in side elevation, partly in section, of the lever mechanism controlling the clutch mechanism and the rock shaft for raising and lowering the floating carriers.

Figure 7 is a view in side elevation partly in section.

Figure 8 is a view of an essential detail, partly in section, of one form of stump jump mechanism and the means for fitting the hoes to the said stump jump mechanism and to the floating frames, or carriers.

Figure 9 is a plan of a twin seed and fertilizer delivery box constructed according to this invention.

Figure 10 is a fragmental plan of a modified construction of the same showing four separate compartments.

Figure 11 is a fragmental plan of a further modification of the twin seed and fertilizer delivery box showing one arrangement of controlling the feed of the fertilizer to the respective hoes.

Figures 12, 13 and 14 are views illustrating in diagrammatic plan the staggering arrangement of the tines and hoes when arranged in three, four and five parallel rows across the machine.

Figure 15 is a diagrammatic view in side elevation of the preferred manner of driving the shaft of the grain feeding mechanism, and Figure 16 is a similar view of a modification of the said drive.

Figure 17 is a view in plan of the preferred drive for the fertilizer shafts when a double star wheel feeding mechanism is employed.

Figure 18 is a view in plan of the drive for the fertilizer feeding mechanism when a single row of star wheels is employed, each star wheel adapted to each feed a plurality of conduits.

According to this invention a rectangular frame 1, above the rear portion of which is supported a dual grain and fertilizer box 2, is mounted upon a pair of rear driving and main traction wheels 3, and forwardly on two steering wheels 4, the pillars 5 of the wheels 4 being supported by sleeves 6 connected by a front bar 7. The frame is also provided with diagonal connecting beams 8 while further transverse beams 9 and 10 are also provided.

The forward ends of the beams 8 are connected to the bar 7 by clamps 11 while further clamps 12 connect the beams 8 to the front bar 13 of the main frame 1.

The draft swingle trees (not shown) are mounted forwardly of the frame and are connected by the chain 14 with the draw rods 15 through the triangular link 16 disposed below the front beam 7.

Should it be desired to connect the draft swingle trees on either side of the centre, the bar 17 may be adjusted by means of the chain 18 which is interchangeably engaged in perforations 19 distanced along the bar 17 at either side of the front link of the chain 14 of the draft mechanism. This bar 17 and the chain 18 are clamped to the front bars 20, which are pivotally connected at each end to the adjacent rearwardly extending steering arm 21 which latter is connected to the lower ends of the adjacent steering wheel pillar 5 so that should the draft exert a pull on either side of the centre, the steering wheels will automatically follow the direction of the draft travel.

The main frame and the mechanism carried thereby are capable of being raised or lowered according to whether the implement is in tilling operation or being transported, the raising and lowering mechanism consisting of a quadrant rack 22 fitted to the tie bar 23 which is arranged transversely and secured to the top of the pillars 5 at 24.

The main tractor wheels 3 are loosely mounted on stub axles 37 carried in bearings secured to the underside of the central beam 10 of the frame, and each wheel is fitted with a hub 39 projecting inwardly and provided with a sprocket wheel 40 gearing by a chain 41 with another sprocket 42 on the rear countershaft 43 which is mounted in bearings 44 supported by the side walls of the seed and fertilizer box 2.

The sprocket wheel 42 is fixed to a sleeve 45 mounted loosely on the countershaft 43 within the bearing 44, the inner end of the sleeve 45 being flanged and formed with clutch teeth 46 which are adapted to be engaged by the clutch teeth 47 on a collar 48 having a sliding movement on the countershaft 43, the sliding movement being limited by a pin 49 secured to the countershaft upon which the collar 48 is adapted to slide by means of the slot 50 formed in the said collar.

The clutch collar 48 is under the tension of a compression spring 51 which is held at its opposite end in position by a collar 52 fitted to the countershaft 43. The clutch 46, 47 is thrown into and out of gear by a sliding arm 53, the rear end of which is provided with a bifurcated member 54 adapted to pass between the sleeve 44 and the collar 48, the rear portions of the arms of the bifurcated member 54 being narrower than the inner portions, the wider and narrower portions being connected by inclined surfaces 55, and when the narrower portion 56 of the bifurcated member is between the collar 48 and the sleeve 44 as shown in Figure 3, the clutch members mesh owing to the pressure of the spring 51 acting on the clutch collar 48 and the drive is imparted to the operating mechanism of the implement.

When the widened end 57 of the bifurcated member 54 passes between the clutch collar 48 and the sleeve 44, as illustrated in Figure 5, the clutch mechanism is disengaged being held open against the compression of the spring 51 and the operating parts are thus idle and the machine ready for transport.

The forward end of the bar 53 pivotally connects at 58 with the short arm 59 bolted to the rocker arm 60 which extends transversely of the main frame and is supported in bearings 61 mounted on the frame, as illustrated in Figure 2.

The rocker arm or bar 60 is also provided with a clamp 62 having a short arm 63 with a bifurcated end 64 to allow of the pivotal connection therewith of a link 65 connected to a link 66, one end of which link 66 is pivoted at 67 to a bracket 68 fitted to the cross beam 10 of the main frame 1.

The opposite end of the link 66 is capable of adjustment to and on a further link 67$^a$ which is pivoted at 68 to the bifurcated end 69 of a short arm 70 secured to a rearwardly projecting rod 71 preferably square in cross section and mounted in bearings 72 and 73 fitted to the main frame. The outer end of this rod 71 connects with a lever 74 at the rear of the frame and this lever 74 is provided with the usual spring controlled pawl 75 engaging a quadrant rack 76 fitted to the stay beam 77, one end of which connects with the main frame and the upper end connects with the grain box.

In the operation of the lever and when it is raised, the interconnecting links 67$^a$, 66, and 65 causes the operation of the rocker bar 60 which causes the sowing hoes and tines to come into operative position for tilling purposes through the levers 78 which support vertical rods 79 connecting at the lower end with floating frames 80 supporting the hoes 81.

A pair of arms 78 and rods 79 is employed for each carrier the parts being so positioned that they connect with both sides of the carriers.

The rods 79 are capable of a vertical movement relatively to the arms 78 and a helical spring 83 surrounds each rod 79 between the corresponding arm and the floating frame, so that should the hoe or tine strike a stump or other obstacle in the course of travel, the floating carrier is automatically raised against the compression of the springs 83 irrespective of the position of the arms 78.

In order to facilitate the raising of the floating frames 80 by the lever 74, the rocker bar 60 is provided with arms 84 arranged on either side of the frame and extending forwardly thereof. These arms 84 carry rods 85 adapted to slide forwardly in brackets 86 while a compression spring 87 extends around each rod 85 and is so arranged as to facilitate the raising of the floating carriers and consequently the hoes carried thereby on the operation of the lever 74.

The floating carriers 80 are preferably somewhat rectangular in shape and are arranged parallel with each other below the main frame 1, being pivoted at 88 at the front ends to brackets 89 depending from said frame.

Preferably four floating carriers 80 are employed in a twenty-five furrow implement, being arranged side by side across the implement from wheel to wheel and substantially in line with each other and each floating carrier 80 is provided with cross pieces 90 on which are mounted stump jump arms or supports 91 carrying combined hoes and tines, the supports 91 being bolted as at 92 to the cross members 90. The hoes consist of hollow comparatively deep narrow conduit receivers 93 wider at the top than at the bottom where each hoe is fitted at its forward edge with a cultivating tine or share.

The preferred form of stump jump mechanism is illustrated in Figures 7 and 8 and preferably consists of a forwardly projecting arm 104 fitted to or formed near the top of the front of the hoe 81 and adapted to pass within the bifurcated or grooved supporting bracket or arm 91, the bifurcation 105 of which opens through the rear portion of the top of the arm 91 as at 106.

The arm 104 of the hoe is pivoted by a pin or the like 107 at a point near the body of the hoe to allow the cultivating tool and hoe to rise rearwardly from the said pivot, the outer or forward end of the hoe arm 104 being normally held in position by a spring 108 which is fitted to and extends from the end of the carrier or supporting member 91 and is bent around the same under the free end of the hoe arm 104 to lock the said arm in its normal position in the groove 105.

The hoe arm therefore rests in the slot 105 formed in the supporting member 91 so giving the hoe and tine adequate support while allowing of their free rearward movement from the pivot 107.

The end of the member 91 to which the hoe is pivotally connected is provided with a vertical extension 109 which is slotted as at 110 to receive and support one end of a sliding rod 111 which is provided adjacent its other end with a fixed ring or flange 112, said rod carrying an expansible coil spring 113 which bears at opposite ends against said extension and flange. The extreme inner end of the slidable rod 111 is bifurcated as at 114 and engages a transverse pin 115 carried by lugs 116 or the like at the upper end of the hoe frame 93.

The combined hoe and tines and stump jump mechanism as above described are mounted in a plurality of rows in staggered formation on the floating carriers 80 in such a manner that the furrows are three and one half inches apart and where four floating carriers are mounted to a twenty-five furrow implement, the first, second and third carriers would mount a similar number of hoes and tines and stump jump mechanism and the rear seed compartment 133 of the seed and fertilizer distributor box 2 would have thirteen grain feeding orifices 134 and the front grain feeding compartment 135 would have twelve grain feeding orifices 136.

In the construction illustrated in Figure 9, the grain and fertilizer box is divided into three compartments, 134, 135, and 137 the central compartment 137 being used for feeding fertilizer to the hoes.

The grain and fertilizer compartments are fitted with hinged lids (not shown) and the floor is provided with suitable grain and fertilizer distributing devices (not shown) but preferably the well-known star or cone feed is utilized for the fertilizer and the vertically arranged flanged wheels are provided for the grain feed, it being preferable that the ribs of the grain wheels be formed slightly closer together than at present to increase the volume of feed to the conduits 138 leading to the hoes.

The delivery chutes of the grain and fertilizer feed connect with the conduits in the usual manner, each fertilizer and seed conduit extending to its respective hoe 81 for sowing.

The central compartment 137 would consequently be provided with the star or cone feeding mechanisms and be provided with two parallel rows of delivery orifices 139 arranged in staggered formation with respect to each other, the front orifices being twelve in number and the rear orifices thirteen in number to correspond with the number of grain feeding orifices and the hoes employed in a twenty five furrow implement.

In the modification illustrated in Figure 10, the seed and fertilizer box is divided into four compartments, the two outer compartments 133 and 135 being utilized for feeding grain to the hoes and the two inner compartments 140, 141 being utilized for the fertilizer feed.

In the modification illustrated in Figure 11 the seed and fertilizer box is divided into three compartments 133, 135 and 137, as shown in Figure 9, the fertilizing compartment 137 being provided with a single row of feeding mechanisms 142 consisting of star wheels operating over a plurality of orifices 143, each orifice leading to its particular conduit connecting with the corresponding hoe and in the illustration one star feed wheel is adapted to operate and feed three orifices positioned in staggered formation such as illustrated in Figure 9.

In the construction illustrated in Figure 11 each star wheel operates over three orifices and feeds the fertilizer to three separate conduits of the system but it will be readily understood that the star wheel may be adapted to feed two, three or more orifices leading to the conduits without departing from the spirit and scope of the invention.

The seed and fertilizer sowing shafts are driven by special gear but each individual cone or star wheel for the fertilizer and ribbed wheel for the grain feeding mechanism are preferably driven through the well-known bevel gear as at present employed with seed and fertilizer drills.

The grain and fertilizer distributing shafts are driven from respective sides of the centre of the main driving countershaft 43, and one, two or more sprocket wheels 146 of varying sizes adjustable along the countershaft are employed for such purpose, the respective sprockets being employed according to the speed it is desired to feed to the hoes. One of these sprockets 146 is connected by a chain 151ª (Figure 15) with a further sprocket 147 detachably mounted on a small shaft 148 carried by a bearing bracket 149 depending from the grain and fertilizer box 2. This sprocket, being detachable, may be replaced by sprockets of different sizes if so desired to regulate the speed.

On the small shaft carrying the detachable sprocket 147, is a small pinion 149ª gearing with a pinion 150 on the rear seed distributing shaft 151. The front seed distributing shaft 152 is driven from the shaft 148 by a second sprocket on the said shaft 148 which is connected by a chain 153 with a sprocket wheel 154 on a spindle 155 supported in bearings and carrying a further sprocket wheel connected by a chain 156 with a sprocket wheel 157 driving the front seed distributing shaft 152.

Both front grain feeding mechanisms are arranged out of line with the rear grain feeding mechanism, being approximately three and one half inches from centre to centre away from each other, that is to say, although each of the rear and front grain feeding mechanisms are approximately seven inches apart if lines were drawn parallel with each other through the centre of each grain or fertilizer feeding mechanism, the distance between such parallel lines would be approximately three and one-half inches, and as the fertilizer feeding mechanisms are arranged in substantially the same way, the feeding chutes of the grain and fertilizer hoes looking from the underside assume a somewhat staggered formation.

In the arrangement of stump jump mechanism as illustrated in Figures 7 and 8, when fitted to the floating carriers 80, the construction of the carriers will be as illustrated in Figure 2, the one carrier 80 being stepped inwardly and the next carrier 80 outwardly at the rear to allow of room for the necessary fittings, that is to say, the carriers 80 at the rear are out of line with the front portions as illustrated in the said figure.

In a modification of the drive for the grain distributors the rear grain shaft 151 is driven from the wheel sprockets 40 by means of the chains 41 and sprockets 42 on the countershaft 43. Any one of the sprocket wheels 146 on the countershaft 43 is connected by a chain 158 with a sprocket wheel 159 on a short spindle 160 mounted in bearings and provided with a spur pinion 161 meshing with another spur pinion 162 on the rear grain distributing shaft 151 as indicated in Figure 16.

The front grain distributing shaft 152 is driven from the spindle 160 by a chain 163 which leads from a second sprocket wheel on the said spindle 160 to a sprocket wheel 164 on a spindle 165 carrying a pinion 166 in mesh with a pinion 167 which in turn meshes with a pinion 168 on the front grain distributor shaft 152.

The drive for the fertilizer distributing spindles is illustrated more particularly in Figures 17 and 18. On the countershaft 43 and from one of the sets of sprocket wheels 146 mounted thereon a chain 169 leads to a sprocket wheel 170 on a short spindle 171 upon which is mounted a spur pinion 172 in mesh with a pinion 173 which in turn meshes with a spur pinion 174 on the rear fertilizer distributing shaft 175. On the spindle 171 is a further pinion 176 meshing with a spur pinion 177 on the front fertilizer distributing shaft 178.

When a single row of star wheels 142 as illustrated in Figure 11 is to be driven, the drive consists of a chain 179 (Figure 18) leading from one of the sprocket wheels 146 on the countershaft 43 to a sprocket wheel 180 on a short spindle 181 fitted with a spur pinion 182 meshing with a spur pinion 183 on the fertilizer distributor shaft 184.

I desire it to be understood that it may not be necessary in some instances to fit a hoe to each furrow former in which case a hoe would only be fitted to alternate tines so that a furow former or tine only would be positioned between each pair of combined hoes and tines in the system and any other form of staggering may be employed without departing from the spirit and scope of the invention, and if desired the implement may be arranged with the drilling hoes and cultivators in two rows in staggered formation.

Having now fully described and ascertained my said invention and the manner in which it is to be performed, I declare that what I claim is—

An implement of the class described, comprising a main frame, tractor wheels therefor, a plurality of parallel floating frames arranged side by side and pivotally suspended from the front of said main frame, a plurality of seed and fertilizer conduits carried by each of said floating frames and arranged in staggered relation, stump jump mechanism independently connecting each individual conduit to its floating frame, a combined grain and fertilizer box having independent grain and fertilizer compartments provided with delivery orifices, delivery chutes leading from said delivery orifices to said conduits, distributing devices in said compartments, operating means for said distributing devices, a driving connection including a clutch between said operating means and the tractor wheels, and means for simultaneously raising and lowering all of said floating frames and at the same time throwing said clutch out or in, each of said floating frames being capable of vertical movement independent of said raising and lowering means.

Signed at Nhill, in the State of Victoria, Commonwealth of Australia, this 8 day of January, 1920.

JOHANN HEINRICH REICHELT.

Witnesses:
SIDNEY HENDLEY,
EDWARD HARRISON.